(12) United States Patent
Sparkman et al.

(10) Patent No.: US 6,196,582 B1
(45) Date of Patent: Mar. 6, 2001

(54) VARIABLE OUTPUT INFLATOR FOR AN AIR BAG

(75) Inventors: John Paul Sparkman; Shawn Gregory Ryan, both of Dayton; Allen Richard Starner, Springboro; Robert Raymond Niederman, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/400,588

(22) Filed: Sep. 22, 1999

(51) Int. Cl.⁷ .................................................. B60R 21/26
(52) U.S. Cl. ........................................ 280/736; 280/741
(58) Field of Search ..................................... 280/741, 736, 280/740, 737, 742

(56) References Cited

U.S. PATENT DOCUMENTS

| | | |
|---|---|---|
| 3,861,712 | 1/1975 | Matsui et al. . |
| 5,221,109 | 6/1993 | Marchant . |
| 5,330,226 | 7/1994 | Gentry et al. . |
| 5,366,242 | 11/1994 | Faigle et al. . |
| 5,413,378 | 5/1995 | Steffens, Jr. et al. . |
| 5,630,619 * | 5/1997 | Buchanan et al. .................... 280/741 |
| 5,664,802 * | 9/1997 | Harris et al. ......................... 280/736 |
| 5,695,214 | 12/1997 | Faigle et al. . |
| 5,707,078 | 1/1998 | Swanberg et al. . |
| 5,709,405 | 1/1998 | Saderholm et al. . |
| 5,788,275 * | 8/1998 | Butt et al. ............................. 280/737 |
| 5,863,066 * | 1/1999 | Blumenthal .......................... 280/737 |
| 5,970,880 * | 10/1999 | Perotto ................................. 280/741 |
| 5,992,881 * | 11/1999 | Faigle .................................. 280/737 |
| 6,039,346 | 3/2000 | Ryan et al. . |
| 6,039,348 * | 3/2000 | Niederman et al. ................. 280/741 |

FOREIGN PATENT DOCUMENTS

| | | |
|---|---|---|
| 19704501A1 | 8/1997 | (DE) . |
| 800967A2 | 1/1997 | (EP) . |
| 3-32957 | 2/1991 | (JP) . |

* cited by examiner

*Primary Examiner*—Michael Mar
*Assistant Examiner*—Lynda Jasmin
(74) *Attorney, Agent, or Firm*—Kathryn A. Marra

(57) ABSTRACT

The present invention presents an inflator providing variable output inflation of an air bag cushion in response to full or reduced level deployment conditions. The inflator of the present invention includes a first chamber for storing an inert gas, a second chamber in fluid communication with the first chamber, and a third chamber in selective fluid communication with the second chamber, the third chamber for storing a heat modifier for varying a heat value of the inert gas. The inflator also includes a pyrotechnic device having a combustible material for heating the inert gas and a first initiator for actuating the pyrotechnic device upon first and second deployment conditions. A second initiator for opening the third chamber to the second chamber is provided wherein actuation of the second initiator causing the heat modifier to fluidly communicate with the combustible material and vary the heat value of the inert gas during a combustion process. The second initiator is actuated during second deployment conditions.

15 Claims, 1 Drawing Sheet

VARIABLE OUTPUT INFLATOR FOR AN AIR BAG

TECHNICAL FIELD

The present invention relates generally to vehicle supplemental inflatable restraint systems and, more particularly, to an air bag inflator that provides variable output inflation of an air bag.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation. It is also known in the art to use a system having two discrete inflators to accomplish dual level inflation. In these types of systems, two discrete inflators are deployed at the same time or at a delayed time depending upon the severity of the sudden deceleration.

SUMMARY OF THE INVENTION

This invention offers advantages and alternatives over the prior art by providing an inflator which provides for variable output inflation of an air bag cushion in response to full or reduced level deployment conditions. The inflator of the present invention includes a first chamber for storing an inert gas, a second chamber in fluid communication with the first chamber, and a third chamber in selective fluid communication with the second chamber, wherein the third chamber stores a heat modifier for varying a heat value of the inert gas. The inflator also includes a pyrotechnic device having a combustible material for heating the inert gas and a first initiator for actuating the pyrotechnic device upon first and second deployment conditions. A second initiator for opening the third chamber to the second chamber is provided wherein actuation of the second initiator causes the heat modifier to fluidly communicate with the combustible material and vary the heat value of the inert gas during a combustion process. The second initiator is actuated during second deployment conditions. The inflator also includes a diffuser having a vent port for releasing the heated inert gas from the inflator to the air bag cushion.

The heat modifer is preferably selected from the group consisting of accelerants, inhibitors, and catalysts. When the heat modifier comprises an accelerant, the output inflation under first level deployment conditions is less than the output inflation under second level deployment conditions because the accelerant creates additional heat during the pyrotechnic process causing greater gas expansion. Likewise, when the heat modifier comprises a catalyst, the output inflation under first level deployment conditions is less than the output inflation under second level deployment conditions because the catalyst causes the combustible material in the pyrotechnic device to increase its reaction rate without adding material to the mass balance. This causes the pressure of the heated inert gas to increase resulting in an increase in gas expansion. In a third embodiment, when the heat modifier comprises an inhibitor, the output inflation under first level deployment is greater than the output inflation under second level deployment conditions because the inhibitor reduces the heat value added to the stored inert gas and thus decreases the gas expansion.

Accordingly, in the first and second embodiments, the inflator has a primary low level of operation because the actuation of the first initiator results only in low level deployment of the air bag cushion. To increase the level of deployment, the second initiator is actuated causing either the accelerant or catalyst to be introduced into the second chamber and combined with the pyrotechnic material during the combustion process. In contrast, the inflator, in the third embodiment, has a primary high level of operation because the actuation of the first initiator results in a high level of deployment and the actuation of the second initiator reduces the level of deployment. Accordingly, the present invention provides a variable output inflator where the level of output is variable in response to the inflator receiving an additional actuation signal from a control system, including the controller. Advantageously, the inflator of the present invention offers a low cost method of producing a variable output inflator for use with an air bag module and the ability to offer multiple inflator outputs from a single inflator body reduces package size, module costs, and module complexity.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
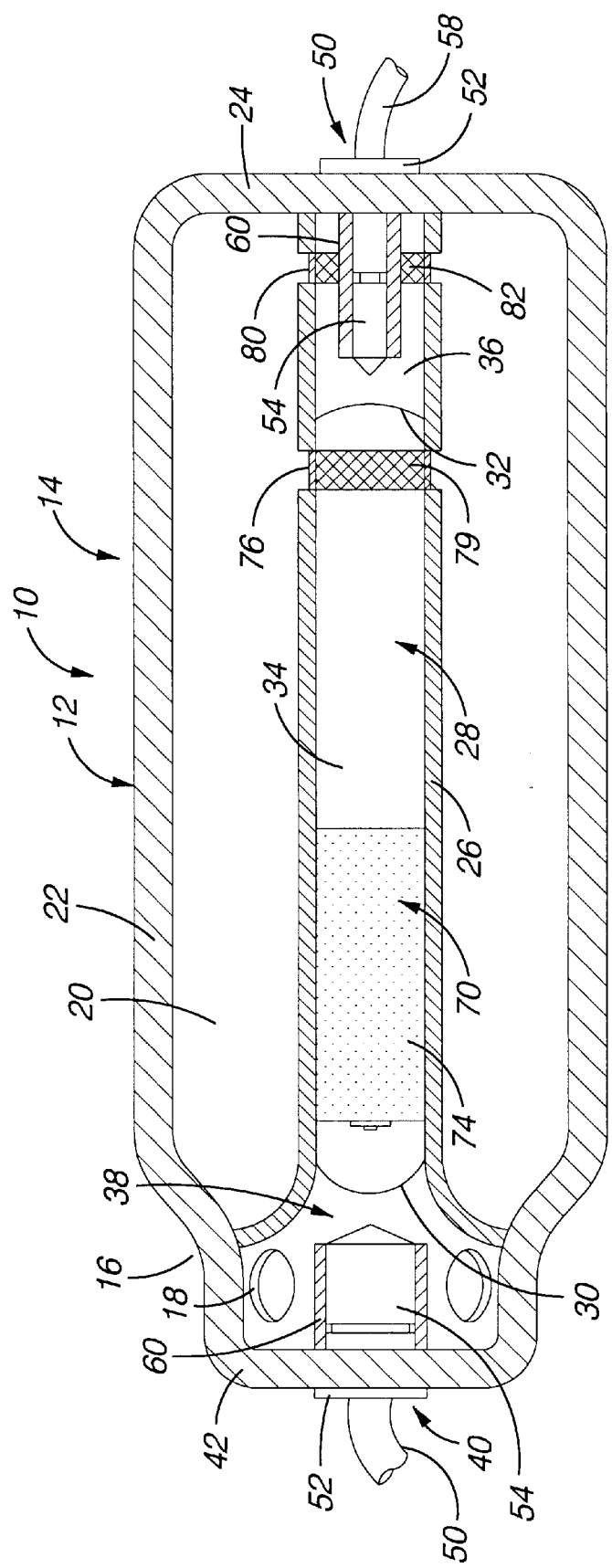
FIG. 1 is a sectional side view of an inflator embodying the present invention.

Referring to the FIG. 1, a variable inflator for use with an air bag module (not shown) according to the present invention is generally indicated at 10. Upon actuation of inflator 10 in response to fast deceleration of a motor vehicle, heated gas passes from inflator 10 to inflate an air bag cushion (not shown). Inflator 10 of the present invention is intended for use in driver side air bag modules, passenger side air bag modules, side impact air bag modules, and other air bag modules. Inflator 10 releases a predetermined volume of heated gas in accordance with the appropriate degree of inflation required for the sensed deceleration of the motor vehicle.

A controller (not shown), e.g., a sensing and actuating system, generates actuation signals to inflator 10 in response to velocity responsive sensors (not shown) mounted on the vehicle bumper and/or acceleration or inertia responsive sensors mounted on a part of the vehicle occupant compartment, such as the fire wall. In response to the sensed signals, the controller provides ignition signals to inflator 10 to initiate a full-deployment inflation or a reduced deployment inflation of the air bag cushion in accordance with a predetermined level of deceleration. In response to the ignition signals, inflator 10 releases an appropriate amount of gas into the air bag cushion through vent ports 18 of a diffuser 16 for full or reduced level of deployment, as will be described in greater detail hereinafter.

Inflator 10 includes a housing 12 for storage of gas generating materials. In an exemplary embodiment, housing 12 is generally cylindrically shaped. Housing 12 includes a gas storage portion 14 and diffuser 16 at one end of inflator 10. Diffuser 16 provides a plurality of vent ports 18 disposed circumferentially about inflator 10 for releasing heated gas generated by inflator 10 to the air bag cushion upon actuation, as described hereinbefore.

Inflator 10 includes an outer annular chamber 20 disposed within the inner periphery of gas storage portion 14 thereof for retaining an inert gas, such as argon. The gas may be stored at a high pressure, as will be described hereinafter. Outer chamber 20 is defined by an outer cylindrical wall 22 of housing 12, an end wall 24 of housing 12 and an inner wall 26. Preferably, inner wall 26 is cylindrically shaped. End wall 24 and inner cylindrical wall 26 define a central cavity 28. Inner and outer rupturable seals or diaphrams 30, 32, respectively, partition central cavity 28 into a first central chamber 34 and a second central chamber 36. Seals 30, 32, also known as burst disks, are formed of a rupturable material, such as aluminum and stainless steel, to permit fluid communication therethrough when ruptured. Burst disks 30, 32 are fixed to inner wall 26, such as by welding, to form a gas tight seal. Outer burst disk 30 is disposed at opening 38 of central cavity 28 adjacent diffuser 16 for closing off central cavity 28 from diffuser 16. Inner burst disk 32, disposed at a predetermined distance between outer burst disk 30 and end wall 24 of inflator 10, separates first and second central chambers 34, 36 of central cavity 28. Inner burst disk 32 is disposed within central cavity 28 to provide fluid communication between first and second central chambers 34, 36.

Inflator 10 further includes a first initiator mechanism 40 disposed at an end wall 42 of diffuser 16 for rupturing first burst disk 30 to release the stored inert gas to diffuser 16. In addition, first initiator mechanism 40 ignites a pyrotechnic heating device 70 disposed in first central chamber 34. Inflator 10 also includes a second initiator mechanism 50, disposed at end wall 24, for rupturing second burst disk 32 to provide fluid communication between second central chamber 36 and first central chamber 34 of central cavity 28. Initiator mechanisms are known in the art and suitable initiator mechanisms may be used in accordance with the present invention. Each initiator mechanism 40, 50 comprises a squib 52 disposed behind a projectile 54 for propelling projectile 54 inward towards each respective burst disk 30, 32 in response to an ignition signal provided by the controller through independent leads 56, 58. A retainer 60 holds each corresponding projectile 54 in alignment with the respective burst disk 30, 32. Each retainer 60 extends proximate to the corresponding burst disk 30, 32 to guide the travel of the projectile 54.

Pyrotechnic heating device 70 is disposed within first central chamber 34 of central cavity 28. Pyrotechnic device 70 includes a striker 72 for igniting pyrotechnic material 74 that rapidly heats the stored gas upon acutation of first initiator 40 in response to the ignition signals generated by the controller. Inner wall 26 includes a plurality of first apertures 76 that provide fluid communication between outer storage chamber 20 and first central chamber 34 of central cavity 28. A first screen 79 is disposed within first central chamber 34 adjacent the plurality of first apertures 76 so that fluid traveling through the plurality of first apertures 76 also travels through first screen 79 which acts to filter unwanted particles as the stored gas flows according to a first fluid flow path in which the stored gas flows from outer storage 20 through the plurality of first apertures 76 to the first central chamber 34 where the gas exits at opening 38 into diffuser 16 before passing to the air bag cushion.

The pyrotechnic heating device 70 comprises devices that are known in the art and may comprise in one embodiment a predetermined mass of heating material disposed in first central chamber 34 of central cavity 28. The material may be one or more different materials, such as igniter and generant, which when subjected to a brief flash of heat or charge produced by striker 72, produces additional heat for heating the inert gas disposed in first central chamber 34 and outer storage chamber 20. In addition, pyrotechnic device 70 may include a primer (not shown) whereby the primer is designed to ignite when striker 72 is forced into the primer in response to the actuation of the igniter.

Inner wall 26 includes a plurality of second apertures 80 that provide fluid communication between outer storage chamber 20 and second central chamber 36 of central cavity 28. Similar to first central chamber 34, a second screen 82 is disposed within second central chamber 36 adjacent the plurality of second apertures 80 so that fluid traveling through the plurality of second apertures 80 also travels through second screen 82 which acts to filter unwanted particles as the gas flow according to a second fluid flow path in which the stored gas flows from outer storage 20 through the plurality of second apertures 80 to the second central chamber 34 then through the first central chamber 32 where the gas exits at opening 38 into diffuser 16 before passing to the air bag cushion. The flow of gas through the plurality of second apertures 80, once burst disk 32 is ruptured, facilitates the mixing of the heat modifier with pyrotechnic material 74 because the gas flow acts to carry the heat modifier into first central chamber 34 into contact and mixing with pyrotechnic material 74.

In accordance with the present invention, inflator 10 offers variable output performance by modifying the heat value added to the stored gas in outer storage chamber 20 during the heating process as a result of the actuation of pyrotechnic device 70. In other words, inflator 10 is designed so that either accelerants, inhibitors, or catalysts and the like (heat modifiers) are combined with the pyrotechnic material 74 to vary the volume of the stored gas exiting inflator 10 into the air bag cushion. More specifically, second central chamber 36 stores either an accelerant, an inhibitor, or a catalyst depending upon the precise desired configuration and output of inflator 10. In general terms, accelerants, inhibitors, and catalysts are used in combination with a pyrotechnic material to modify the pyrotechnic reaction which causes the stored gas to be heated so that the proper level of inflation is realized. Any suitable heat modifier may be used with the present invention and may come in a variety of forms, including but not limited to powders in a suitable package material which is designed to break apart and release the material once second initiator mechanism 50 actuates. For example, when an accelerant is combined with the pyrotechnic material, the stored gas is heated to a higher temperature and thus the volume of the stored gas which is heated and exits increases. The introduction of an inhibitor to the pyrotechnic material reduces the heat added to stored gas resulting in a decrease in the volume of the gas exiting inflator 10. A catalyst causes the pyrotechnic material to increase its reaction (combustion) without adding material to the mass balance. Thus, by using either an accelerant, inhibitor, or catalyst, a modification may be made to the heat being added to the stored gas, wherein the type and degree of modification is dependent on the design intent of inflator 10.

In a first embodiment, inflator 10 includes an accelerant disposed within second central chamber 36. In low level deployment conditions due to sudden low level deceleration, only squib 52 of first initiator mechanism 40 is ignited thereby propelling projectile 54 through first burst disk 30 and into striker 72. Striker 72 is forced into either an ignition train or a primer to ignite combustible material 74 within first central chamber 34. The inert gas stored in outer storage chamber 20 and first central chamber 34 is thereby heated as combustion of the material occurs, and thus increasing the pressure of the stored inert gas and accordingly expanding the gas. The hot inflator gas flows from outer storage chamber 20 through first apertures 76 and opening 38 created by the ruptured first burst disk 30. The heated gas exits inflator 10 through vent ports 18 of diffuser 16 to inflate the air bag cushion at a reduced level.

In high level deployment conditions due to sudden high level deceleration, both the first and second initiator mechanisms 40, 50 are actuated. The ignition of squib 52 of second initiator mechanism 50 propels projectile 54 through second burst disk 32. The rupture of second burst disk 32 causes the accelerant disposed within second central chamber 36 to be introduced into first central chamber 34 where the accelerant combines with pyrotechnic material 74. The combination of accelerant to pyrotechnic material 74 results in a modification of the pyrotechnic reaction causing more heat to be generated during the combustion of these materials. By modifying the pyrotechnic reaction in such a way, the pressure of the stored inert gas increases and accordingly the inert gas expands. The increased volume of hot inflator gas flows through first and second apertures 76, 80 and first and second central compartments 34, 36 through opening 38 created by the ruptured first burst disk 30 and exits inflator 10 through vent ports 18 of diffuser 16 to inflate the air bag cushion at a high level.

In accordance with a second embodiment of the present invention, inflator 10 includes a catalyst disposed within second central chamber 36. In low level deployment conditions due to sudden low level deceleration, only squib 52 of first initiator mechanism 40 is ignited thereby propelling projectile 54 through first burst disk 30 and into striker 72. Striker 72 is forced into either an ignition train or a primer to ignite combustible material 74 within first central chamber 34. The inert gas stored in outer storage chamber 20 and first central chamber 34 is thereby heated as combustion of the material occurs, and thus increasing the pressure of the stored inert gas and accordingly expanding the gas. The hot inflator gas flows from outer storage chamber 20 through first apertures 76 and opening 38 created by the ruptured first burst disk 30. The heated gas exits inflator 10 through vent ports 18 of diffuser 16 to inflate the air bag cushion at a reduced level.

In high level deployment conditions due to sudden high level deceleration, both the first and second initiator mechanisms 40, 50 are actuated. The ignition of squib 52 of second initiator mechanism 50 propels projectile 54 through second burst disk 32. The rupture of second burst disk 32 causes the catalyst disposed within second central chamber 34 to be introduced into first central chamber 32 where the catalyst combines with pyrotechnic material 74. The combination of a catalyst to pyrotechnic material 74 causes the pyrotechnic material to increase its reaction without adding material to the mass balance. In other words, the introduction of the catalyst modifies the pyrotechnic reaction causing more heat to be generated during the combustion process. By modifying the pyrotechnic reaction in such a way, the pressure of the stored inert gas increases and accordingly the inert gas expands. The increased volume of hot inflator gas flows through first and second apertures 76, 80 and first and second central compartments 34, 36 through opening 38 created by the ruptured first burst disk 30 and exits inflator 10 through vent ports 18 of diffuser 16 to inflate the air bag cushion at a high level.

In a third embodiment, inflator 10 includes an inhibitor disposed within second central chamber 36. In high level deployment conditions due to sudden high level deceleration, only squib 52 of first initiator mechanism 40 is ignited thereby propelling projectile 54 through first burst disk 30 and into striker 72. Striker 72 is forced into either an ignition train or a primer to ignite combustible material 74 within first central chamber 34. The inert gas stored in outer storage chamber 20 and first central chamber 34 is thereby heated as combustion of the material occurs, and thus increasing the pressure of the stored inert gas and accordingly expanding the gas. The hot inflator gas flows from outer storage chamber 20 through first apertures 76 and opening 38 created by the ruptured first burst disk 30. The heated gas exits inflator 10 through vent ports 18 of diffuser 16 to inflate the air bag cushion at a high level.

In low level deployment conditions due to sudden low level deceleration, both the first and second initiator mechanisms 40, 50 are actuated. The ignition of squib 52 of second initiator mechanism 50 propels projectile 54 through second burst disk 32. The rupture of second burst disk 32 causes the inhibitor disposed within second central chamber 36 to be introduced into first central chamber 34 where the inhibitor combines with pyrotechnic material 74. The combination of an inhibitor to pyrotechnic material 74 modifies the pyrotechnic reaction causing less heat to be generated during the combustion process. By modifying the pyrotechnic reaction in such a way, the pressure of the stored inert gas decreases and accordingly the volume of the inert gas is reduced. The decreased volume of hot inflator gas flows through first and second apertures 76, 80 and first and second central compartments 34, 36 through opening 38 created by the ruptured first burst disk 30 and exits inflator 10 through vent ports 18 of diffuser 16 to inflate the air bag cushion at a low level.

Accordingly, in the first and second embodiments, inflator 10 has a primary low level of operation because the actuation of first initiator mechanism 40 results only in low level deployment of the air bag cushion. To increase the level of deployment, second initiator mechanism 50 is actuated causing either the accelerant or catalyst to be introduced into first central chamber 34 and combined with the pyrotechnic material 74 during the combustion process. In contrast, inflator 10, in the third embodiment, has a primary high level of operation because the actuation of first initiator mechanism 40 results in a high level of deployment and the actuation of second initiator mechanism 50 reduced the level of deployment. The present invention provides a variable output inflator where the level of output is variable in response to the inflator receiving an additional actuation signal from a control system, including the controller. Advantageously, inflator 10 of the present invention offers a low cost method of producing a variable output inflator for use with an air bag module and the ability to offer multiple inflator outputs from a single inflator body (housing 12) reduces package size, module costs, and module complexity.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An inflator for providing variable output inflation of an air bag cushion; the inflator comprising:

a first chamber for storing an inert gas;

a second chamber in fluid communication with the first chamber, a third chamber in selective fluid communication with the second chamber, the third chamber for storing a heat modifier for varying a heat value of the inert gas;

a pyrotechnic device having a combustible material for heating the inert gas;

a first initiator for actuating the pyrotechnic device upon first and second deployment conditions;

a second initiator for opening the third chamber to the second chamber, actuation of the second initiator causing the heat modifier to fluidly communicate with the combustible material and vary the heat value of the inert gas during a combustion process, the second initiator being actuated during second deployment conditions; and a diffuser having a vent port for releasing the heated inert gas from the inflator.

2. The inflator as set forth in claim 1, wherein the heat modifier is selected from the group consisting of accelerants, inhibitors, and catalysts.

3. The inflator as set forth in claim 1, further comprising:

a first rupturable seal providing a gas tight barrier between the diffuser and the second chamber and a second rupturable seal providing a gas tight barrier between the second and third chambers.

4. The inflator as set forth in claim 1, wherein the first initiator opens a first fluid flow path permitting fluid communication between the diffuser and the first and second chambers upon the first and second deployment conditions.

5. The inflator as set forth in claim 3, wherein the first initiator includes a first projectile for rupturing the first rupturable seal, and a first squib that provides a charge to propel the first projectile upon first and second level deployment conditions; and wherein the second initiator includes a second projectile for rupturing the second rupturable seal, and a second squib that provides a charge to propel the second projectile upon the second level deployment condition.

6. The inflator as set forth in claim 1, wherein the heat modifier comprises an accelerant, whereby the output inflation under first level deployment condition is less than the output inflation under second level deployment condition.

7. The inflator as set forth in claim 1, wherein the heat modifier comprises a catalyst, whereby the output inflation under first level deployment conditions is less than the output inflation under second level deployment conditions.

8. The inflator as set forth in claim 1, wherein the heat modifier comprises an inhibitor, whereby the output inflation under first level deployment conditions is greater than the output inflation under second level deployment conditions.

9. The inflator as set forth in claim 1, wherein the second chamber is formed by an inner cylindrical wall extending between a housing, the inner cylindrical wall including first and second apertures permitting fluid communication between the first chamber and the second and third chambers.

10. A method for variably inflating an air bag cushion using an air bag inflator, the method comprising:

providing a first chamber for storing an inert gas;

providing a second chamber in fluid communication with the first chamber;

providing a third chamber in selective communication with the first chamber, the third chamber for storing a heat modifier for varying a heat value of the inert gas;

providing a diffuser having a vent port for releasing heated gas to the air bag cushion;

igniting a pyrotechnic device to heat the inert gas upon first and second level deployment conditions;

opening the third chamber to permit fluid communication of the heated gas from the third chamber to the second chamber causing the heat modifier to fluidly communicate with combustible material in the pyrotechnic device and vary the heat value of the inert gas during a combustion process, the third chamber being opened under second level deployment conditions; and opening the second chamber to permit fluid communication of the heated gas from the second chamber to the diffuser upon the first and second level deployment conditions.

11. The method as set forth in claim 10, wherein the opening of the second chamber comprises actuating a first initiator to rupture a first gas tight seal disposed between the second chamber and the vent port of the diffuser; and wherein the opening of the third chamber comprises actuating a second initiator to rupture a second gas tight seal disposed between the second and third chambers, under second level deployment conditions.

12. The method as set forth in claim 10, wherein the heat modifier is selected from the group consisting of accelerants, inhibitors, and catalysts.

13. The method as set forth in claim 10, wherein the modifier is an accelerant, whereby the output inflation under the first level deployment conditions is less than the output inflation under second level deployment conditions.

14. The method as set forth in claim 10, wherein the modifier is a catalyst, whereby the output inflation under first level deployment conditions is less than the output inflation under second level deployment conditions.

15. The method as set forth in claim 10, wherein the modifier is an inhibitor, whereby the output inflation under first level deployment conditions is less than the output inflation under second level deployment conditions.

* * * * *